Patented Aug. 8, 1944

2,355,203

UNITED STATES PATENT OFFICE 2,355,203

SEPARATION OF SOLIDS FROM MIXTURES OF SOLIDS AND LIQUIDS

Edward L. Cole, Beacon, N. Y., assignor to The Texas Company, New York, N. Y., a corporation of Delaware No Drawing. Application February 2, 1943, Serial No. 474,487

5 Claims. (Cl. 196—18)

This invention relates to the separation of solids from mixtures of solids and liquids and more particularly to the separation of wax-like solids from mixtures containing them with the aid of a solvent liquid.

The invention contemplates separating wax from a mixture of wax and oil and also the separation of waxy material from liquid mixtures, with a solvent comprising a chloronitro paraffin, advantageously a chloronitro paraffin having from about 2 to 6 carbon atoms per molecule. Examples of suitable chloronitro paraffins include:

1-chloro-1-nitroethane
1-chloro-1-nitropropane
1,1-dichloro-1-nitroethane
1,1-dichloro-1-nitropropane and
2-chloro-2-nitropropane.

The compounds named as examples range in molecular weight from about 109 to about 158 and have a specific gravity at 20° C. relative to water at 20° C., ranging from about 1.258 to 1.405. They have a boiling range of about 122 to 144° C.

1-chloro-1-nitroethane has the formula:

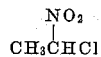

while 2-chloro-2-nitropropane has the formula:

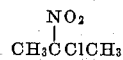

These compounds are effective as dewaxing solvents or as components of dewaxing solvents for use in the separation of wax from wax-bearing lubricating oil stocks and may also be employed as solvents for the separation of oil from waxy concentrates.

The lower molecular weight members such as 1-chloro-1-nitroethane, 1-chloro-1-nitropropane and 1,1-dichloro-1-nitroethane may be used alone as dewaxing solvents, particularly for light stocks including gas oil and Diesel oil. They may be used alone or in admixture with a small amount of an aromatic hydrocarbon or other solvent. The higher molecular weight members may be employed in admixture with a modifying solvent such as methylethyl ketone since they have been found to possess a greater solvent action upon hydrocarbons, and therefore it is advantageous to employ them in conjunction with a liquid such as methylethyl ketone having antisolvent properties.

The lower molecular weight members have substantially less solvent action for normally liquid hydrocarbons, and partake more of the nature of antisolvents. It is advantageous, therefore to employ them in admixture with an oil solvent liquid such as benzol or other aromatic hydrocarbon, or with a higher molecular weight member of the series.

According to one modification of the invention an advantageous dewaxing solvent for the separation of wax from lubricating oil stocks comprises a mixture of a low molecular weight chloronitro paraffin and a higher molecular weight chloronitro paraffin, as, for example, a mixture composed of 1-chloro-1-nitroethane and 1-chloro-1-nitrobutane or a mixture composed of 1-chloro-1-nitroethane and 1,1-dichloro-1-nitropentane. A suitable mixed solvent may be composed of a chloronitro paraffin having from about 2 to 3 carbon atoms per molecule mixed with a chloronitro paraffin having from about 4 to 6 carbon atoms per molecule.

In the following examples a low viscosity wax distillate (about 70 seconds Saybolt Universal at 210° F.) was dewaxed with a solvent comprising a low molecular weight chloronitro paraffin mixed with benzol in different amounts. One part by volume of wax distillate was dissolved in 4 parts by volume of the solvent liquid mixture at a temperature of about 120° F. The solution was then chilled to a temperature of —15° F. and filtered at that temperature to separate the solidified wax constituents from the liquid. The solvent was stripped from the filtrate and the yield and pour point of the resulting dewaxed oil was determined. The composition of the solvent used in each case and the yield and pour point of the resulting dewaxed oil are indicated below.

The experiments with 1-chloro-1-nitropropane gave the following results:

| | 1 | 2 |
|---|---|---|
| Composition of solvent, per cent by volume: | | |
| Chloronitro paraffin | 50 | 60 |
| Benzol | 50 | 40 |
| Yield and pour point of dewaxed oil: | | |
| Per cent by volume of wax distillate | 59.6 | 56.2 |
| Pour point, °F | —12 | —16 |

Similar experiments under similar conditions of solvent dosage and dewaxing temperature were conducted using a solvent comprising 1-chloro-1-nitroethane and benzol with the following results:

| | 1 | 2 |
|---|---|---|
| Composition of solvent, per cent by volume: | | |
| Chloronitro paraffin | 35 | 40 |
| Benzol | 65 | 60 |
| Yield and pour point of dewaxed oil: | | |
| Per cent by volume of wax distillate | 61.5 | 59.8 |
| Pour point, °F | —10 | —16 |

Another set of experiments carried out under the same conditions but using a solvent comprising 1,1-dichloro-1-nitroethane and benzol gave the following results:

|  | 1 | 2 | 3 | 4 | 5 |
|---|---|---|---|---|---|
| *Composition of solvent, per cent by volume:* | | | | | |
| Chloronitro paraffin | 50 | 60 | 70 | 80 | 85 |
| Benzol | 50 | 40 | 30 | 20 | 15 |
| *Yield and pour point of dewaxed oil:* | | | | | |
| Per cent by volume of wax distillate | 64.3 | 61.9 | 60.0 | 59.0 | 58.1 |
| Pour point, °F | −5 | −9 | −12 | −16 | −16 |

The foregoing results indicate that it is advantageous to employ a small proportion of benzol with the low molecular weight chloronitro paraffins when dewaxing a low viscosity wax distillate so as to realize a low dewaxing temperature differential, namely, a small differential in temperature between the filtering temperature and the pour test temperature of the resulting dewaxed oil.

By way of a further example, when employing a solvent composed of a mixture of lower and higher molecular weight chloronitro paraffins, a wax distillate lubricating oil stock having a Saybolt Universal viscosity of about 90 at 210° F. and derived from a Mid-Continent crude is dissolved in a mixture of equal parts by volume of 1-chloro-1-nitroethane and 1,1-dichloro-1-nitropentane in the proportion of about 1 volume of distillate lubricating oil stock to 4 volumes of mixed solvent liquid. This solution is chilled to a temperature of about −15° F. to effect precipitation of wax constituents.

The chilled mixture is then subjected to filtration to remove the precipitated wax and produce a filtrate of dewaxed oil dissolved in solvent liquid. The filtration is advantageously effected with a conventional vacuum filter having provision for subjecting the filter cake to washing in situ with a further quantity of the solvent liquid.

In this way there is obtained a dewaxed oil which after removal of the solvent will have a pour test corresponding substantially to the temperature at which the wax is filtered from the chilled mixture, the yield of dewaxed oil amounting to about 75 to 80% by volume of the distillate charge.

The washed filter cake after removal from the filter may be treated to recover retained solvent liquid or may be treated with additional solvent liquid and subjected to filtration at more elevated temperature to effect a de-oiling operation.

While filtration has been specifically mentioned nevertheless it is contemplated that separation of solidified wax from the wax-bearing solution may be effected by settling or centrifuging.

It is also contemplated that the solvent of this invention may be used in the dewaxing of various types of mineral oil stocks or in the de-oiling of different types of slack waxes and waxy concentrates. It may also be applied to the separation of wax-like bodies from other oil mixtures. It may be employed in the treatment of fatty oils and acids such as derived from vegetable and animal sources.

Mention has been made previously of employing the higher molecular weight chloronitro paraffins in conjunction with an antisolvent such as methylethyl ketone and it is contemplated that other antisolvent liquids may be used including other low molecular weight aliphatic ketones and other known solvents such as nitrobenzene, benzaldehyde and dichlorethyl ether, etc. Likewise in the case of the low molecular weight chloronitro paraffins other oil solvents besides aromatic hydrocarbons may be used including petroleum naphtha, kerosene, etc. If desired, the mixed chloronitro paraffin dewaxing solvent of the present invention may be employed with various modifying solvents including aliphatic ketones, low boiling petroleum fractions and low boiling aromatic hydrocarbons.

In employing the mixed chloronitro paraffin solvent liquid as a dewaxing solvent, it is contemplated that the chloronitro paraffins of different molecular weight may be mixed in any suitable proportion effective to obtain the desired degree of separation between wax and oil and which will depend to a large extent upon the character of the wax-bearing oil stock undergoing treatment. Usually when employing a mixture of a low molecular weight chloronitro paraffin having about 2 to 3 carbon atoms per molecule and a higher molecular weight chloronitro paraffin, the proportion of the latter will range from about 25 to 60%.

Obviously many modifications and variations of the invention, as hereinbefore set forth, may be made without departing from the spirit and scope thereof, and therefore only such limitations should be imposed as are indicated in the appended claims.

I claim:

1. The method of separating waxy material from a mixture of oil and waxy material which comprises mixing the feed mixture with a mixed solvent, in substantial amount, consisting essentially of a mixture of a chloronitro paraffin having from about 2 to 3 carbon atoms per molecule and a solvent for oil, the oil solvent amounting to about 15 to 65% of the solvent mixture, chilling the mixture of feed and solvent to a temperature at which waxy constituents separate from the mixture in solid form while the oil remains substantially completely dissolved in the solvent, and removing the solidified constituents therefrom.

2. The method of separating wax from wax-bearing oil which comprises mixing wax-bearing oil with a solvent, in substantial amount, consisting essentially of a chloronitro paraffin having from about 2 to 3 carbon atoms per molecule and a solvent for oil, the oil solvent amounting to about 15 to 65% of the mixed solvent, chilling the mixture to a temperature at which wax precipitates from the solution while the oil remains substantially completely dissolved in the mixed solvent, separating precipitated wax from the solution by filtration and thereby obtaining dewaxed oil having a pour point corresponding substantially to the temperature at which the wax is filtered from the chilled mixture.

3. The method of dewaxing wax-bearing lubricating oil stock which comprises dissolving said stock in a solvent consisting essentially of a chloronitro paraffin having from about 2 to 3 carbon atoms per molecule and a solvent for oil, the oil solvent amounting to about 15 to 65% of the mixed solvent, chilling the solution to a temperature of about 15° F. at which wax constituents are solidified while the oil remains substantially completely dissolved in the mixed solvent, and separating solidified wax constituents from the chilled mixture by filtration, thereby obtaining a dewaxed oil having a pour point corresponding substantially to the temperature at which the wax is filtered from the chilled mixture.

4. The method of separating wax from wax-bearing oil which comprises dissolving the oil in a solvent consisting essentially of a mixture of a chloronitro paraffin having about 2 to 3 carbon atoms per molecule and a higher molecular weight chloronitro paraffin having about 4 to 6 carbon atoms per molecule the higher molecular weight compound amounting to about 25 to 60% of the mixed solvent, chilling the solution to a temperature at which wax precipitates in solid form, and separating solidified wax from the mixture by filtration, thereby obtaining a dewaxed oil having a pour point corresponding substantially to the temperature at which the wax is filtered from the mixture.

5. The method of separating wax from wax-bearing oil which comprises dissolving the oil in a solvent consisting essentially of a mixture of chloronitroethane and a higher molecular weight chloronitro paraffin having from about 4 to 6 carbon atoms per molecule the higher molecular weight compound amount to about 25 to 60% of the mixed solvent, chilling the solution to a temperature at which wax constituents precipitate therefrom and removing the wax so precipitated by filtration, thereby obtaining a dewaxed oil having a pour point corresponding substantially to the temperature at which the wax is filtered from the mixture.

EDWARD L. COLE.